UNITED STATES PATENT OFFICE.

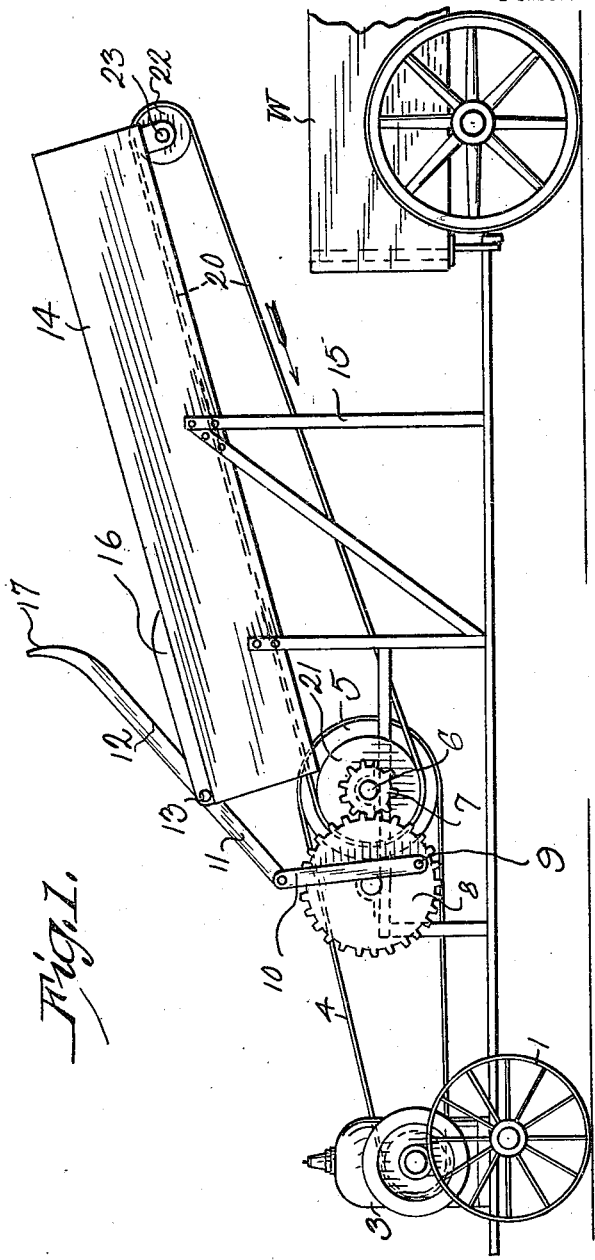

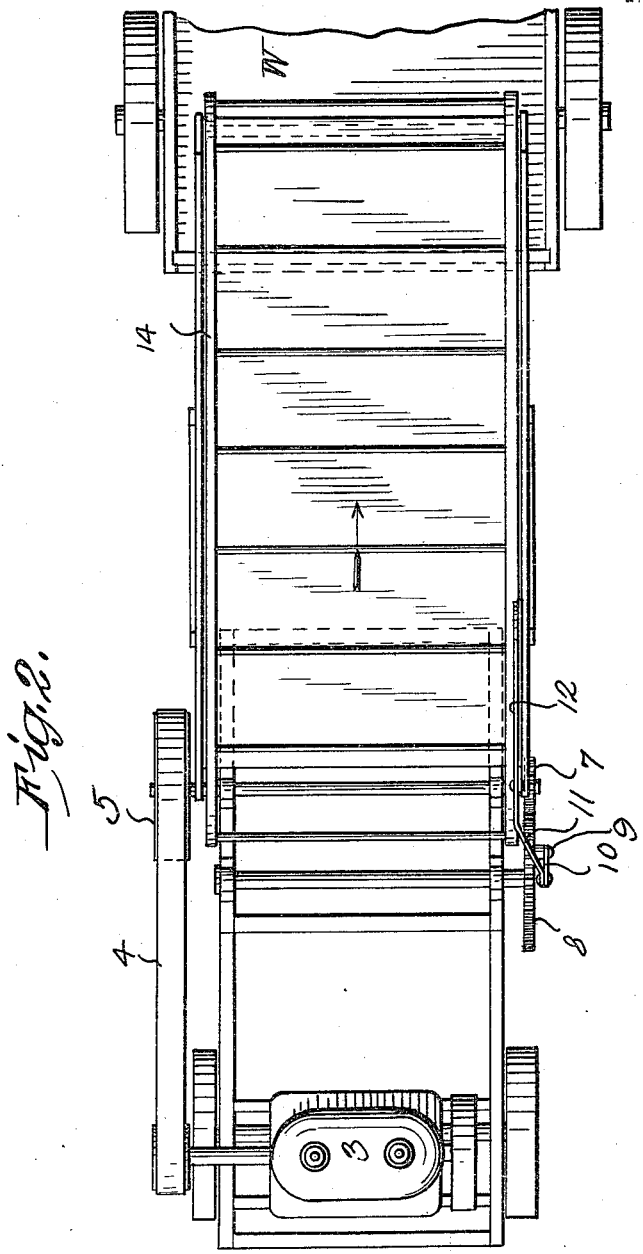

MARSHALL A. BROWN, OF EUREKA, KANSAS.

KAFIR-CORN HEADER.

1,272,371. Specification of Letters Patent. Patented July 16, 1918.

Application filed March 5, 1918. Serial No. 220,529.

*To all whom it may concern:*

Be it known that I, MARSHALL A. BROWN, a citizen of the United States, residing at Eureka, in the county of Greenwood and State of Kansas, have invented certain new and useful Improvements in Kafir-Corn Headers, of which the following is a specification.

This invention relates to corn harvesters, and more especially to those devices known as toppers; and the object of the same is to produce an extremely simple header for Kafir corn and other extremely tall plants.

Broadly speaking, the machine involving the present invention includes cutting mechanism in the nature of shear blades disposed at a relatively high point, and means to cause these blades to open and close rapidly so as to sever the heads of Kafir corn which are caught between or preferably laid between the blades in the passage of the machine. The latter also embraces a carrier leading forward from said cutting mechanism, whereby the heads of corn are conveyed forward and dropped into the body of the wagon or barge.

Details of the preferred construction of this machine are set forth below and shown in the drawings, wherein:—

Figure 1 is a side elevation of the machine complete, showing it as attached to the rear end of a wagon, and Fig. 2 is a plan view.

This machine needs but a single truck and pair of wheels 1, from which a long tongue 2 may lead forward and be attached to a barge or wagon W in any approximate manner. I may say at this point that the wheels 1 in their rotation may furnish power to perform the cutting operation described below, but I prefer to mount a small motor 3 on the running gear about over the axle between the wheels as shown and take power from this source. As illustrated herewith, a belt 4 leads to a driven pulley 5 on a counter shaft 6, and the latter carries a gear pinion 7 meshing with a larger gear 8 rotatably mounted in suitable bearings supported by the tongue or framework. This gear has a wrist pin 9 from which a pitman rod or connecting link 10 leads to and is pivotally connected with one arm 11 of a rocking shear blade 12. The latter is pivoted at 13 on a box-like conveyer frame 14 which is suitably supported as at 15 from the running gear and inclined forwardly and upwardly slightly, and on the frame is mounted a second and fixed shear blade 16 with which the rocking blade 12 coacts. The forward end of the blade 16 is turned downward and the forward end of the rocking blade 12 is given quite an upward bend or turn as shown at 17, so that the heads of the Kafir corn and other plants may be directed between these blades with ease. I have shown no means for so directing the plants between the blades, because it is usual for Kafir corn to incline to a considerable extent, especially when its heads become heavy, but it is quite possible that an operator may ride on the running gear at some appropriate point and pass the bunches of corn between the blades, or it is quite possible that an operator may walk alongside the machine and with an appropriate tool or fork push the heads of the plants between the blades.

For delivering the heads when they are severed from the stalks, an endless belt 20 is provided moving within the conveyer frame 14 and carried at its lower end around a roller 21 fast on the counter shaft 6 and at its upper end around a roller 23 mounted in bearings 22, the direction of motion of this belt being indicated by the arrow. Now when power is applied to the driven wheel 5, its shaft causes the turning of the roller 21 and the movement of the conveyer, and the intermeshing gears 7 and 8 and the wrist pin 9 on the latter cause the rocking of the blade 12 so that the shearing effect takes place as above described, the rocking action being as rapid as the running of the motor and the proportion of the gears will produce. As above suggested, the motor 3 might be replaced by carrying the belt 4 directed to a power wheel on the hub of one of the main wheels 1, but this is a detail which need not be shown. The heads of the corn carried upward by the conveyer, fall over the upper roller into the wagon body or onto the barge and are thus collected and carried away without further attention on the part of the operator.

I have spoken throughout the specification of the vehicle as trailing behind a moving wagon W, and have described the heads of the Kafir corn stalks as being cut during such progress; but it is quite possible of course that the machine could remain stationary and operators could bring the long stalks of Kafir corn to it tied in shocks, and the heading operation could be performed substantially as described above, excepting that the heads fall into the wagon body or onto the barge and the stalks are carried away and used for feed or made into ensilage. In other words, progress of the machine is not necessary to its successful operation, and therefore where I speak of a trailing vehicle I do not wish to be unduly limited.

An important feature of the present invention to which I call especial attention is the fact that the cutting blades work in a vertical plane, one blade being fixed on the side of the frame 14 and the other rising and falling along its cutting edge. This requires that the Kafir corn top be laid across the lower blade, although not necessarily horizontally, but the result will invariably be that the head will overlie the conveyer and will drop into the same after the shearing operation. Such is not always a fact where the cutting blades operate in a substantially horizontal plane and the machine relies on the severed heads falling one way or the other.

What is claimed as new is:—

In a header for Kafir corn and the like, the combination with a box-like body supported in an inclined position, and a conveyer moving upwardly over the bottom thereof; of a fixed blade standing in an upright plane and carried by one side board of the body at its lower end, a moving blade pivoted alongside the fixed blade at and projecting beyond the heel of the latter, a link connected with the projecting end of the moving blade, and unitary power mechanism for moving said link and driving said conveyer simultaneously.

In testimony whereof I affix my signature in presence of two witnesses.

MARSHALL A. BROWN.

Witnesses:
JERRY NICHOLLS,
EARL L. BROWN.

Copies of this patent may be obtained for five cents each, by addressing the "Commissioner of Patents, Washington, D. C."